(12) United States Patent
Nagasawa et al.

(10) Patent No.: US 11,953,465 B2
(45) Date of Patent: Apr. 9, 2024

(54) ZETA-POTENTIAL MEASUREMENT JIG

(71) Applicant: Otsuka Electronics Co., Ltd., Hirakata (JP)

(72) Inventors: Hiroya Nagasawa, Hirakata (JP); Ikuo Wakayama, Hirakata (JP)

(73) Assignee: OTSUKA ELECTRONICS CO., LTD., Osaka (JP)

( * ) Notice: Subject to any disclaimer, the term of this patent is extended or adjusted under 35 U.S.C. 154(b) by 500 days.

(21) Appl. No.: 17/229,827

(22) Filed: Apr. 13, 2021

(65) Prior Publication Data

US 2021/0325340 A1 Oct. 21, 2021

(30) Foreign Application Priority Data

Apr. 16, 2020 (JP) ................. 2020-073731

(51) Int. Cl.
 *G01N 27/447* (2006.01)
(52) U.S. Cl.
 CPC .............. *G01N 27/44704* (2013.01)
(58) Field of Classification Search
 CPC ............. G01N 27/44704; G01N 21/03; G01N 2021/0346
 See application file for complete search history.

(56) References Cited

U.S. PATENT DOCUMENTS

| | | | |
|---|---|---|---|
| 6,051,124 A | 4/2000 | Aoki | |
| 10,274,528 B2 | 4/2019 | Corbett et al. | |
| 2018/0275054 A1 | 9/2018 | Umetsu et al. | |
| 2019/0369046 A1 | 12/2019 | Ichiki et al. | |

FOREIGN PATENT DOCUMENTS

| | | | | |
|---|---|---|---|---|
| DE | 2857486 A1 | * | 9/1980 | ............. G01N 15/00 |
| JP | H05-312757 A | | 11/1993 | |
| JP | H10-104188 A | | 4/1998 | |
| JP | 2012-073078 A | | 4/2012 | |
| JP | 2012-229932 A | | 11/2012 | |
| WO | 2016/117570 A1 | | 7/2016 | |

OTHER PUBLICATIONS

EPO machine-generated English language translation of DE 2857486 A1, patent published Sep. 11, 1980 (Year: 1980).*
Search Report dated Sep. 22, 2021, for corresponding EP Patent Application No. 21168371.9 pp. 1-7.
Office Action dated Sep. 26, 2023, for corresponding JP Patent Application No. 2020-073731, pp. 1-3.

* cited by examiner

*Primary Examiner* — Alexander S Noguerola
(74) *Attorney, Agent, or Firm* — HEA LAW PLLC (57) ABSTRACT

To provide a zeta-potential measurement jig which does not require dedicated tools and enables placement of a sample in a cell with simple work. Provided is a zeta-potential measurement jig, to be used for an electrophoretic mobility measuring device, including: a frame body including: a first holding wall and a second holding wall; and a bottom wall; an intermediate block, and a cell retainer, wherein at least one of the first holding wall or the second holding wall has one of a first groove or a first protrusion to be elastically fitted into the first groove, which is configured to support the intermediate block on a lateral side, and wherein the intermediate block has another one of the first groove or the first protrusion.

9 Claims, 7 Drawing Sheets

ZETA-POTENTIAL MEASUREMENT JIG

INCORPORATION BY REFERENCE

The present disclosure contains subject matter related to that disclosed in Japanese Priority Patent Application JP2020-73731 filed in the Japan Patent Office on Apr. 16, 2020, the entire contents of which are hereby incorporated by reference.

BACKGROUND OF THE INVENTION

1. Field of the Invention

The present invention relates to a zeta-potential measurement jig.

2. Description of the Related Art

There has been known an electrophoretic mobility measuring device configured to measure an electrophoretic mobility or a zeta W potential of particles in a sample cell container, which move under an influence of an electric field. The electrophoretic mobility measuring device radiates light to a sample to which the electric field is applied, and detects light scattered by the sample with a light receiver. A velocity of the particles is calculated by analyzing a frequency component of the detected scattered light. As a result, a particle velocity distribution or a distribution of the electrophoretic mobility of the particles is obtained (see Japanese Patent Application Laid-open No. H10-104188, Japanese Patent Application Laid-open No. 2012-229932, and WO 2016/117570).

A cell having transparent walls is used in the electrophoretic mobility measuring device (see Japanese Patent Application Laid-open No. H05-312757). A sample obtained by suspending a dispersion of particles to be measured is placed in the cell.

SUMMARY OF THE INVENTION

To fix a positional relationship between the cell in which the sample is placed and the electrophoretic mobility measuring device, a zeta-potential measurement jig is used. When the sample leaks out from the zeta-potential measurement jig, the electrophoretic mobility measuring device may get dirty or be damaged thereby. Hitherto, the cell has been fixed with use of bolts and nuts in the zeta-potential measurement jig, and hence the fixing work has been complicated. Further, for a highly precise measurement, light has been required to be radiated at an appropriate angle to the sample placed in the cell. Thus, a plurality of nuts have been required to be tightened with an appropriate torque, and thus the work has been complicated.

The present disclosure has been made in view of the circumstances described above, and has an object to provide a zeta-potential measurement jig, which enables placement of a sample in a cell with simple work.

In order to solve the above-mentioned problem, a zeta-potential measurement jig according the present disclosure is a zeta-potential measurement jig to be used for an electrophoretic mobility measuring device, including: a frame body including: a first holding wall and a second holding wall, which are arranged in such a manner as to be opposed to each other, and each have an opening formed at a corresponding position; and a bottom wall configured to couple a lower end of the first holding wall and a lower end of the second holding wall to each other; an intermediate block, which is configured to form part of a holding space for holding a sample between the first holding wall and the second holding wall, and is arranged above or below a cell in such a manner as to be adjacent to the cell, the cell being arranged between the openings at substantially the same level as that of the openings, and a cell retainer, which is arranged above the intermediate block between the first holding wall and the second holding wall, and is configured to press the cell and the intermediate block toward the bottom wall, wherein at least one of the first holding wall or the second holding wall has one of a first groove or a first protrusion to be elastically fitted into the first groove, which is configured to support the intermediate block on a lateral side, and wherein the intermediate block has another one of the first groove or the first protrusion.

DETAILED DESCRIPTION OF THE INVENTION

An embodiment of the present disclosure is described below with reference to the drawings.

Figure 1A:
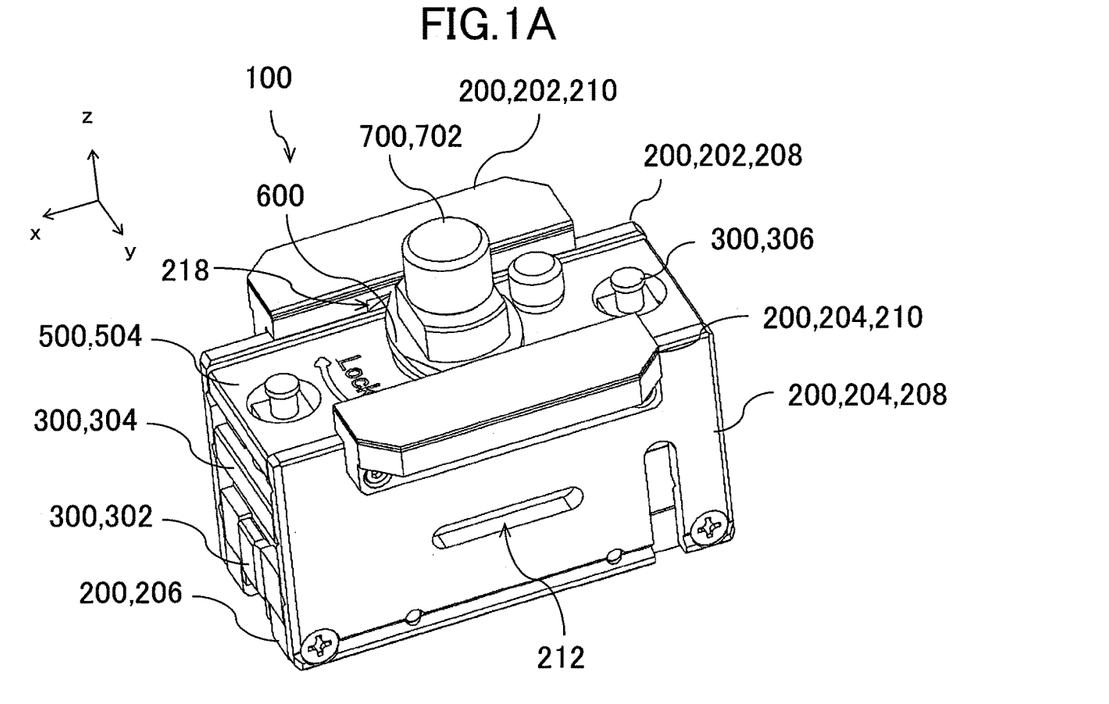
FIG. 1A and FIG. 1B are perspective views of a zeta-potential measurement jig according to one embodiment.
Figure 1B:
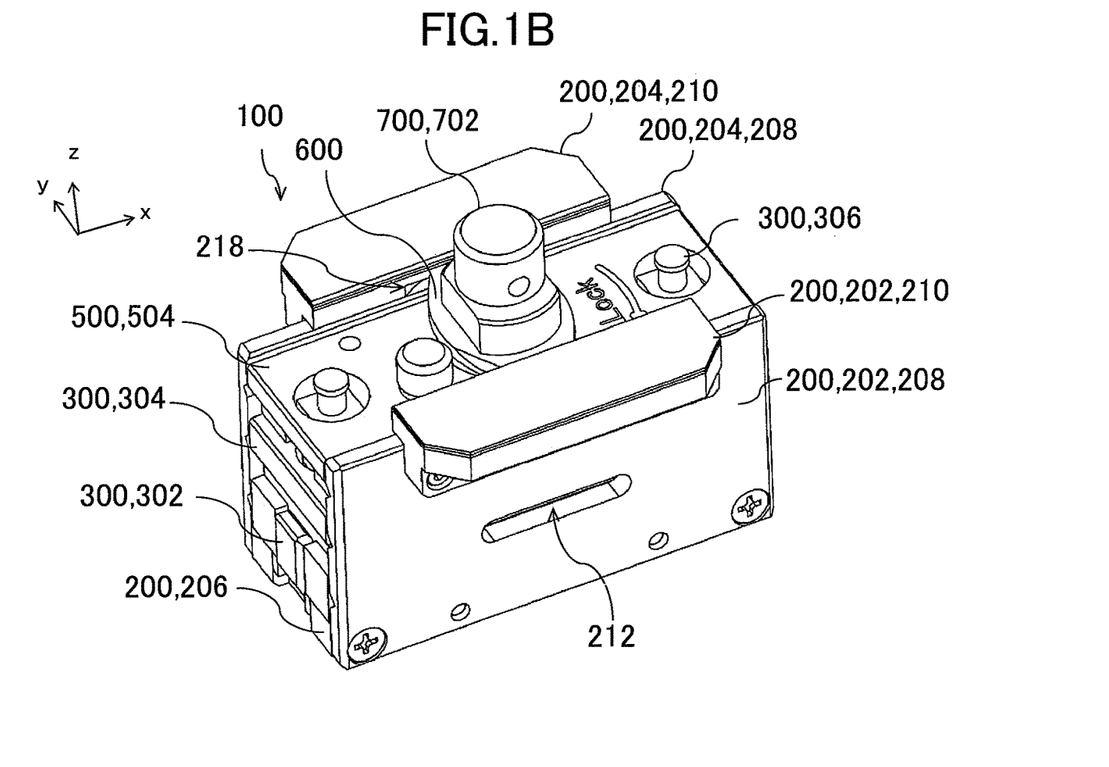

FIG. 1A and FIG. 1B are perspective views when a zeta-potential measurement jig 100 according to this embodiment is viewed in different directions. As illustrated in FIG. 1A and FIG. 1B, the zeta-potential measurement jig 100 according to this embodiment includes a frame body 200, an intermediate block 300, a cell 400, a cell retainer 500, a first pressing portion 600, and a second pressing portion 700. The frame body 200 includes a first holding wall 202, a second holding wall 204, and a bottom wall 206. The intermediate block 300 includes a lower-level block 302, a middle-level block 304, and sample supply knobs 306. The cell retainer 500 includes a cell upper-surface retaining portion 502 and an upper-level block 504.

Figure 2:
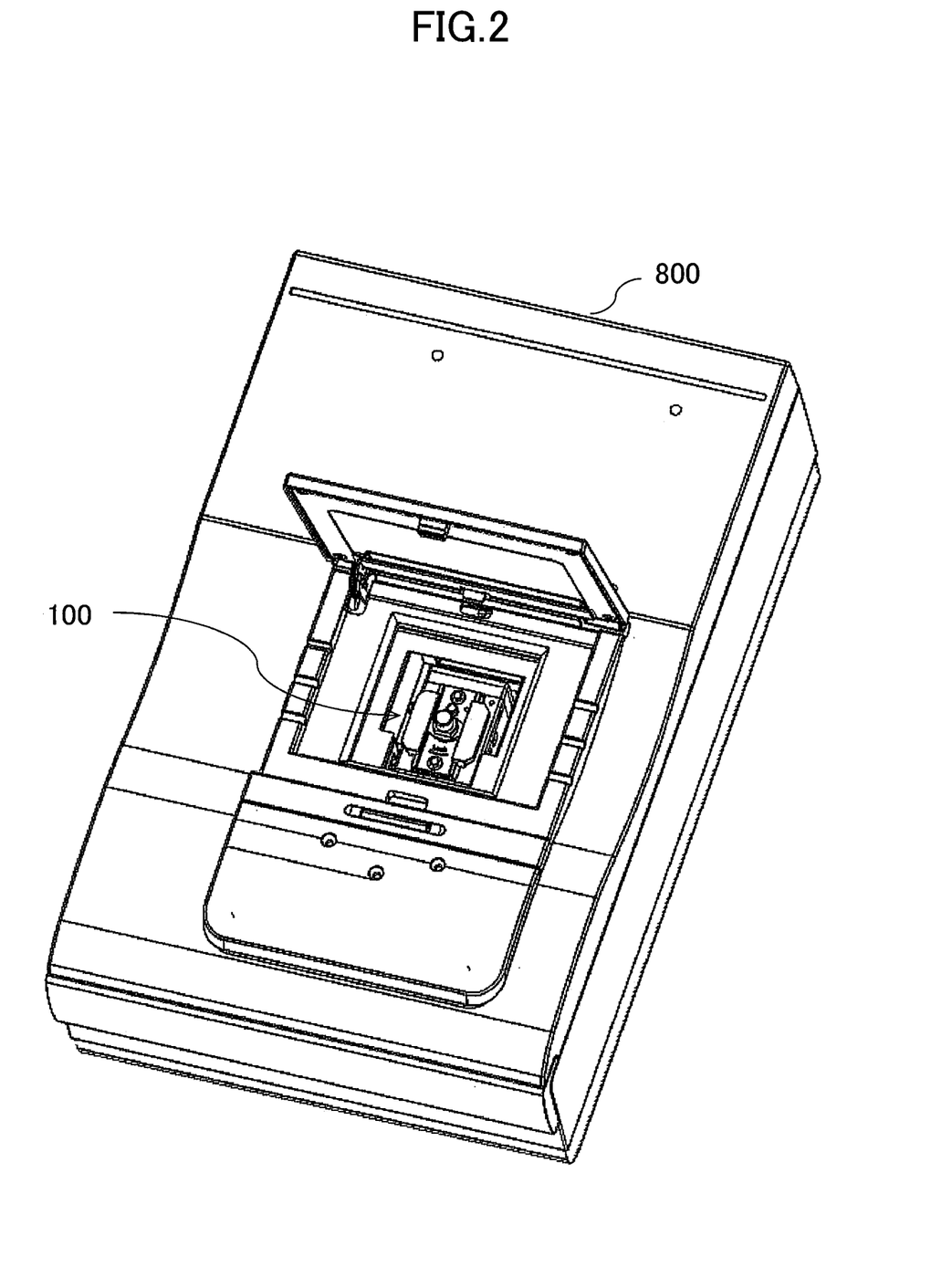
FIG. 2 is a perspective view for illustrating the zeta-potential measurement jig, which is placed in an electrophoretic mobility measuring device.

The zeta-potential measurement jig 100 is used for an electrophoretic mobility measuring device 800. More specifically, the zeta-potential measurement jig 100 is placed in the electrophoretic mobility measuring device 800 illustrated in FIG. 2 to measure a zeta potential. The cell 400 in which a sample is to be placed is arranged inside the zeta-potential measurement jig 100. The electrophoretic mobility measuring device 800 is configured to apply an electric field to the sample placed in the cell 400 through intermediation of an anode plate 220 and a cathode plate 222, which are described later. An opening 212 is formed in each of the first holding wall 202 and the second holding wall 204. The electrophoretic mobility measuring device 800 radiates light for measurement through one of the openings 212. Then, the electrophoretic mobility measuring device 800 measures a zeta potential based on scattered light exiting through another one of the openings 212. A method of measuring the zeta potential is similar to that in the related art, and hence the description thereof is herein omitted.

Figure 3:
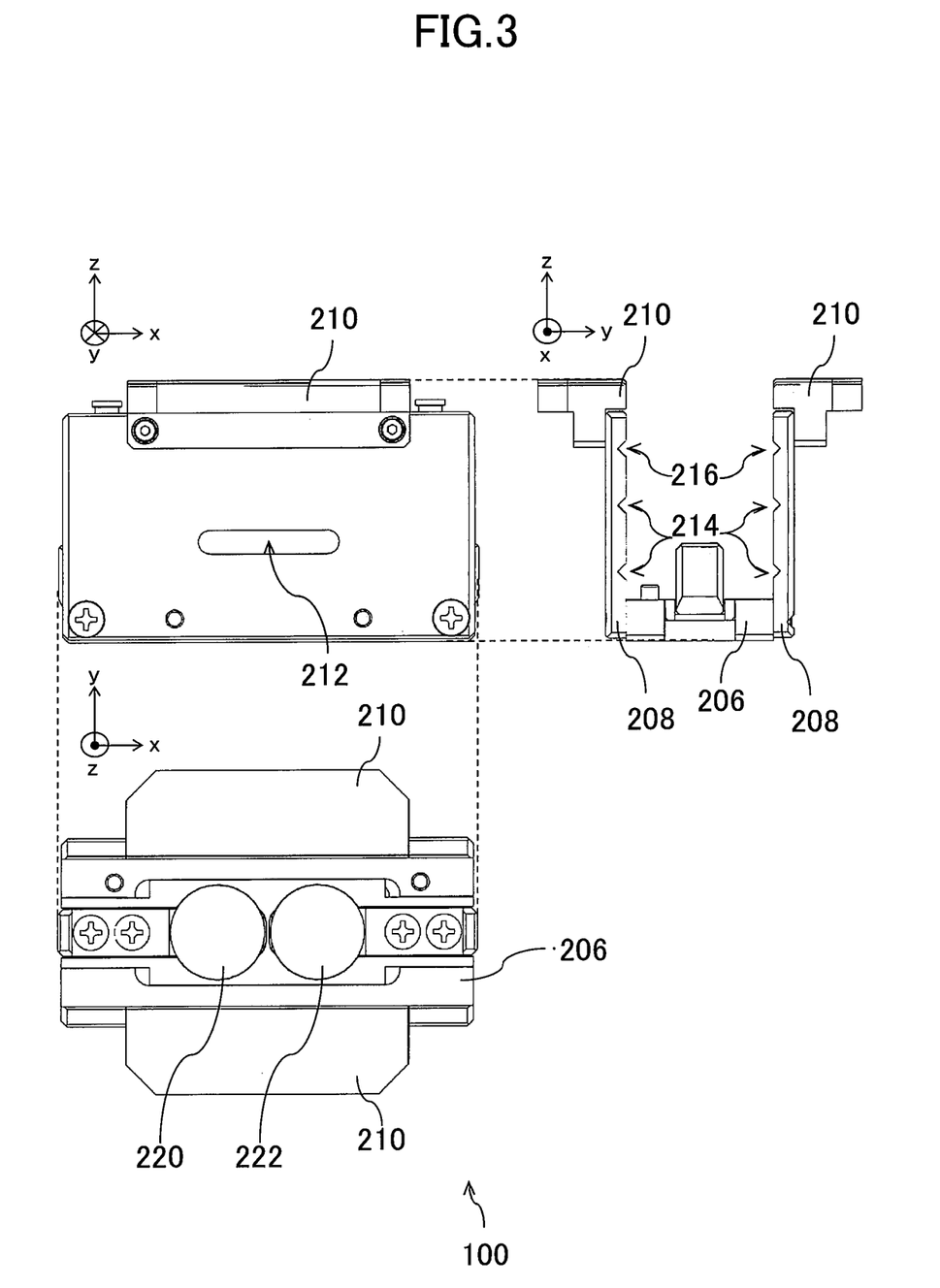
FIG. 3 is a three-side view of the zeta-potential measurement jig.
Figure 4:
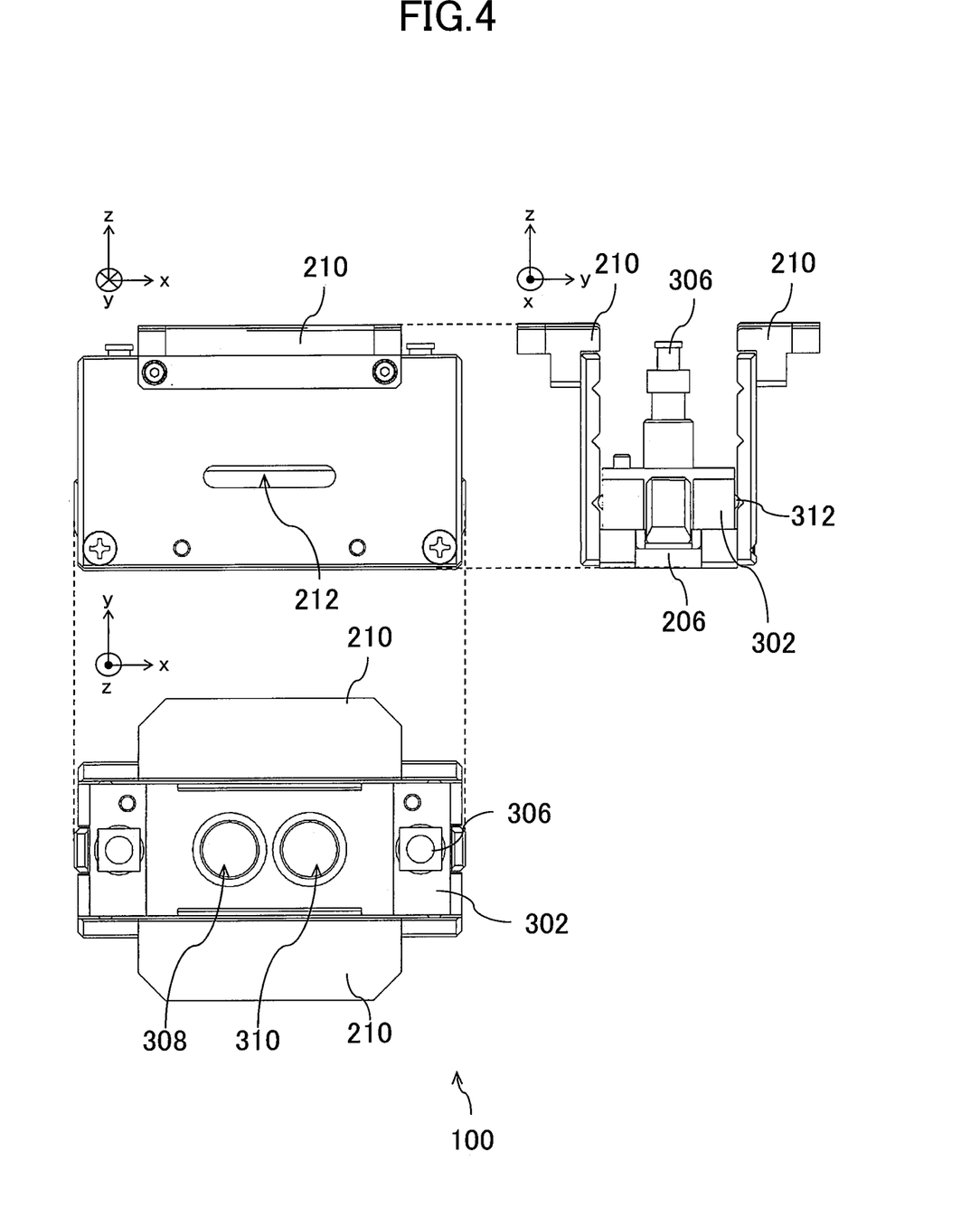
FIG. 4 is a three-side view of the zeta-potential measurement jig.
Figure 5:
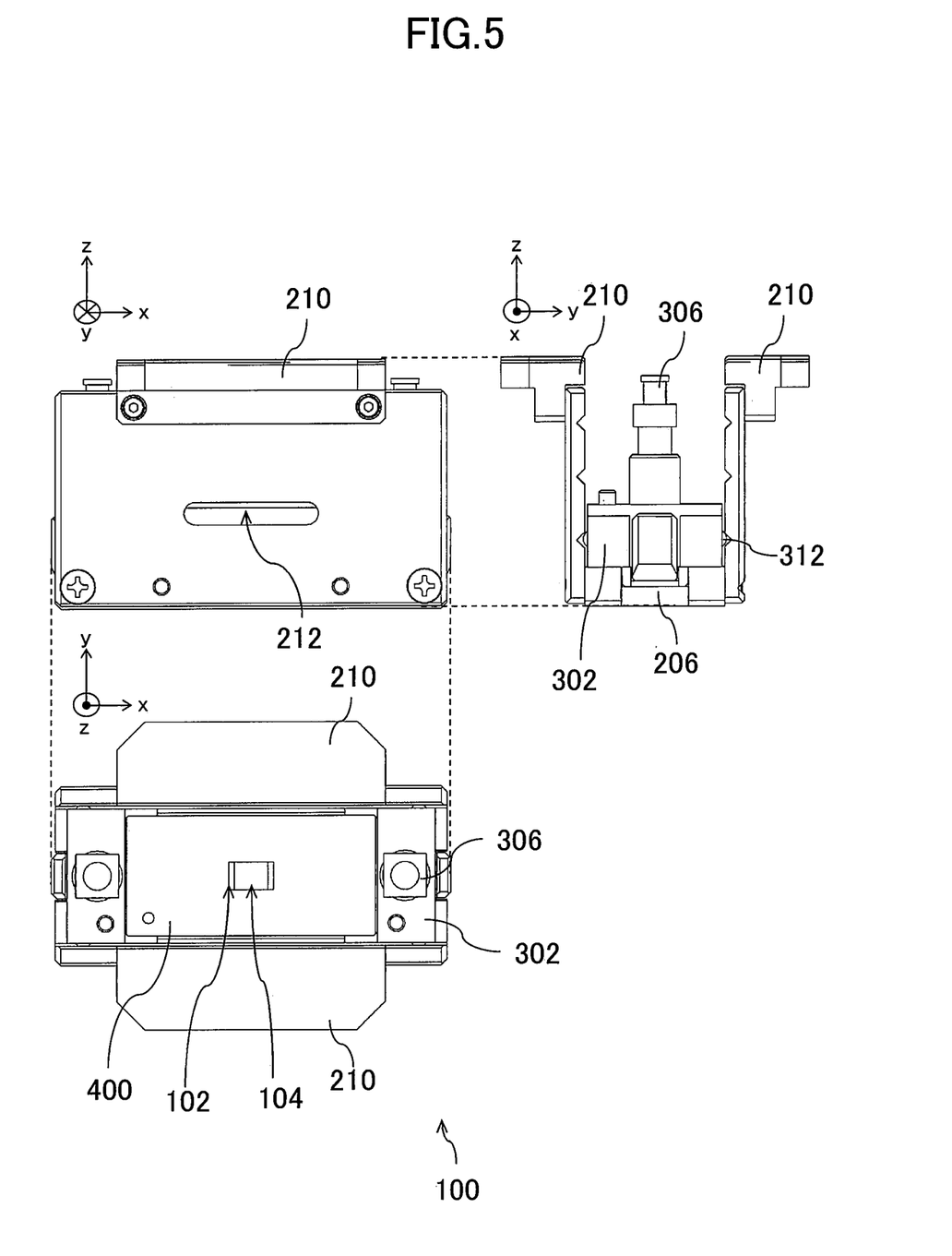
FIG. 5 is a three-side view of the zeta-potential measurement jig.
Figure 6:
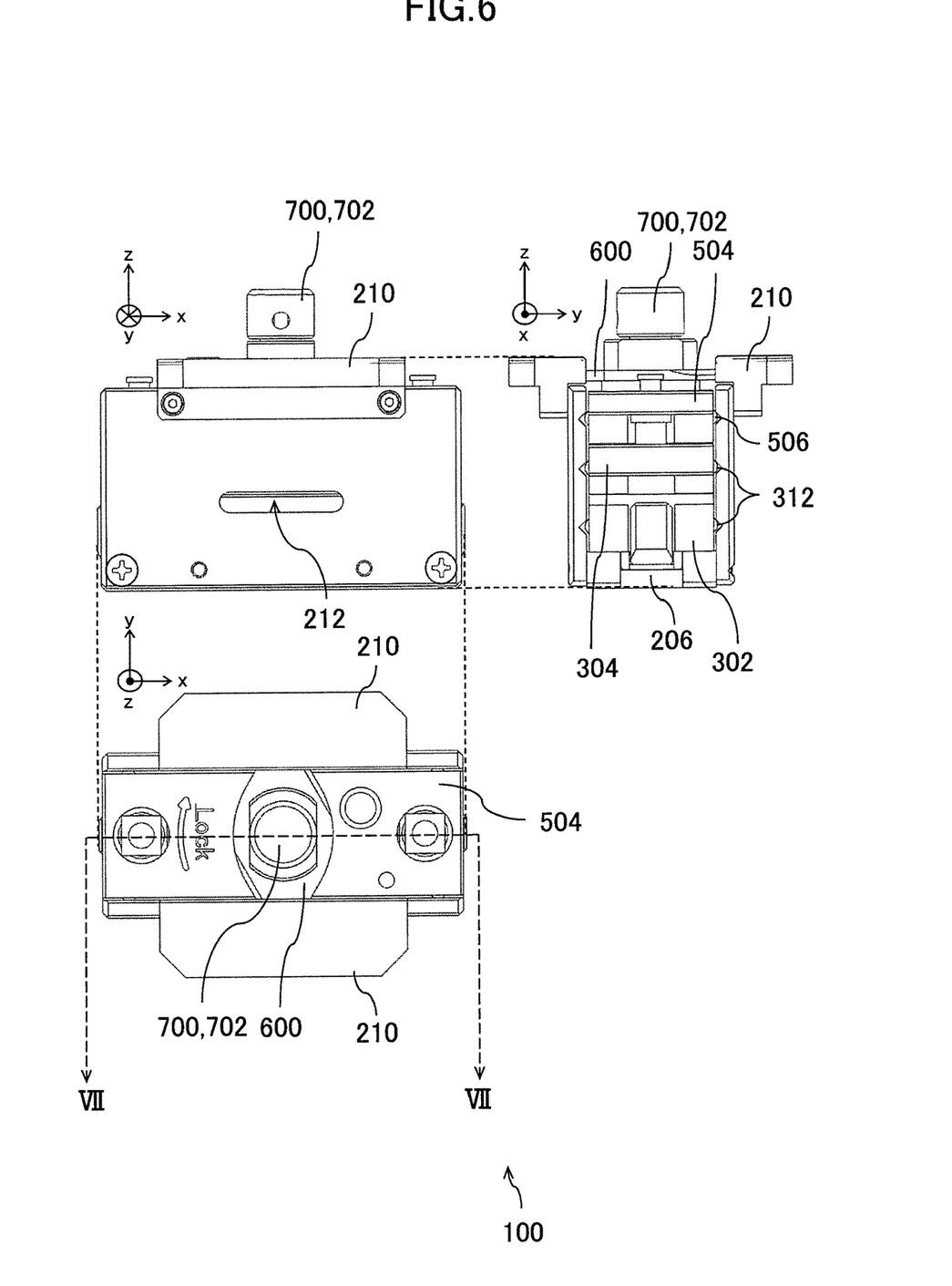
FIG. 6 is a three-side view of the zeta-potential measurement jig.
Figure 7:
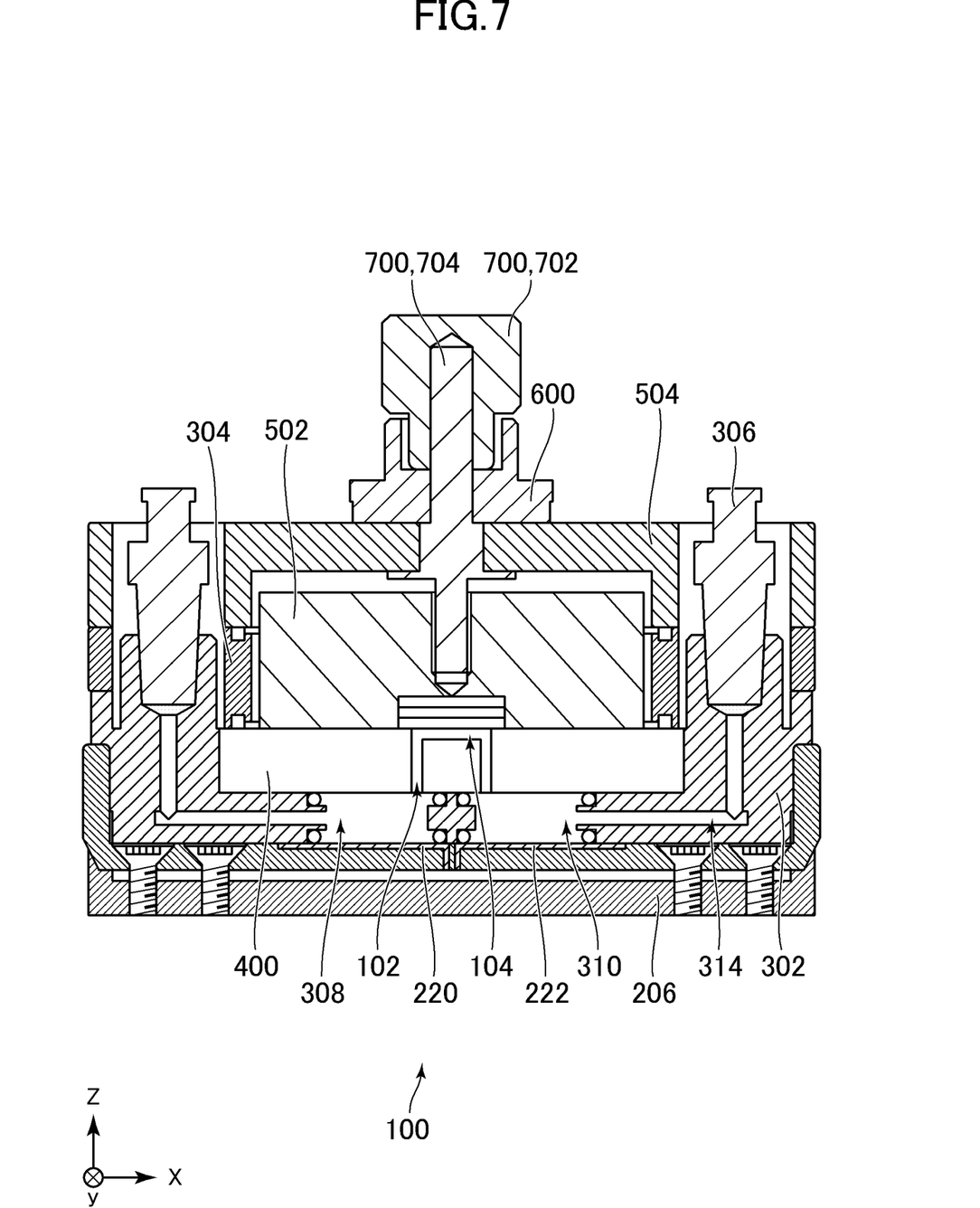
FIG. 7 is a sectional view taken along the line VII-VII.

Now, components of the zeta-potential measurement jig 100 are described with reference to FIG. 3 to FIG. 7. FIG. 3 is a three-side view for illustrating only the frame body 200 among the components included in the zeta-potential measurement jig 100. FIG. 4 is a three-side view for illustrating only the frame body 200, the lower-level block 302, and the sample supply knobs 306. FIG. 5 is a three-side view for illustrating only the frame body 200, the lower-level block 302, the sample supply knobs 306, and the cell 400. FIG. 6 is a three-view for illustrating all the components of the zeta-potential measurement jig 100. FIG. 7 is a sectional view taken along the line VII-VII of FIG. 6.

The first holding wall 202 and the second holding wall 204 are arranged in such a manner as to be opposed to each other, and have the openings 212 at corresponding positions, respectively. More specifically, as illustrated in FIG. 3, each of the first holding wall 202 and the second holding wall 204 includes a plate-like portion 208 and a grip portion 210. The plate-like portion 208 has a shape that has a large surface extending in an xz plane and is thin in a y direction. The grip portion 210 is provided to an upper part (in a z direction) of the plate-like portion 208. The first holding wall 202 and the second holding wall 204 are arranged in such a manner that the xz plane of the plate-like portion 208 of the first holding wall 202 and the xz plane of the plate-like portion 208 of the second holding wall 204 are opposed to each other. The plate-like portions 208 have the openings 212 formed at the corresponding positions, which pass through the plate-like portions 208 in the y direction, respectively. Light to irradiate the sample passes through one of the openings 212, and light scattered by the sample passes through another one of the openings 212.

The bottom wall 206 couples a lower end of the first holding wall 202 and a lower end of the second holding wall 204 to each other. More specifically, the bottom wall 206 is arranged in contact with the lower end of the first holding wall 202 and the lower end of the second holding wall 204, and fixes a positional relationship between the first holding wall 202 and the second holding wall 204 with use of screws. The anode plate 220 and the cathode plate 222 are arranged on the bottom wall 206. One of the anode plate 220 and the cathode plate 222 is electrically connected to a terminal to which a predetermined voltage is applied from the electrophoretic mobility measuring device 800 through intermediation of a conductive plate extending in an x direction. Another one of the anode plate 220 and the cathode plate 222 is electrically connected to a terminal to which a predetermined voltage is applied from the electrophoretic mobility measuring device 800 through intermediation of a conductive plate extending in a −x direction. A voltage higher than that applied to the cathode plate 222 from the electrophoretic mobility measuring device 800 is applied to the anode plate 220.

The intermediate block 300, the cell 400, the cell retainer 500, the first pressing portion 600, and the second pressing portion 700 are arranged between the first holding wall 202 and the second holding wall 204. More specifically, the lower-level block 302, the cell 400, the middle-level block 304, the upper-level block 504, the first pressing portion 600, and the second pressing portion 700 are arranged between the first holding wall 202 and the second holding wall 204 in the stated order in an upward direction (z direction) from the bottom wall 206.

At least one of the first holding wall 202 and the second holding wall 204 has one of a first groove 214 and a first protrusion 312 to be elastically fitted into the first groove 214, which is configured to support the intermediate block 300 on its lateral side. More specifically, each of the plate-like portion 208 of the first holding wall 202 and the plate-like portion 208 of the second holding wall 204 has the first grooves 214 that are formed at a position corresponding to the lower-level block 302 and a position corresponding to the middle-level block 304. The first grooves 214 are formed in a surface of the plate-like portion 208 of the first holding wall 202 and a surface of the plate-like portion 208 of the second holding wall 204, which face each other. The first grooves 214 are formed along the x direction. Plungers provided to the lower-level block 302 and the middle-level block 304 are fitted into the first grooves 214.

In FIG. 3 to FIG. 6, the first grooves 214 are formed at both of the position corresponding to the lower-level block 302 and the position corresponding to the middle-level block 304. The first groove 214 is only required to be formed at least at the position corresponding to the middle-level block 304. Further, it is preferred that the first groove 214 or the first protrusion 312 be formed on both of the first holding wall 202 and the second holding wall 204. However, the first groove 214 or the first protrusion 312 may be formed on only one of the first holding wall 202 and the second holding wall 204.

Further, at least one of the first holding wall 202 and the second holding wall 204 has one of a second groove 216 and a second protrusion 506 to be elastically fitted into the second groove 216, which is configured to support the cell retainer 500 on its lateral side. More specifically, each of the plate-like portion 208 of the first holding wall 202 and the plate-like portion 208 of the second holding wall 204 has the second groove 216 formed at a position corresponding to the upper-level block 504. The second grooves 216 are formed in the surface of the plate-like portion 208 of the first holding wall 202 and the surface of the plate-like portion 208 of the second holding wall 204, which face each other. The second grooves 216 are formed along the x direction. A plunger provided at a corresponding position on the upper-level block 504 is to be fitted into each of the second grooves 216. It is preferred that the second groove 216 or the second protrusion 506 be formed on both of the first holding wall 202 and the second holding wall 204. However, the second groove 216 or the second protrusion 506 may be formed on only one of the first holding wall 202 and the second holding wall 204, or both of the second groove 216 and the second protrusion 506 may be omitted.

Each of the first holding wall 202 and the second holding wall 204 has a region to be brought into contact with an upper surface of the first pressing portion 600 when the first pressing portion 600 is located in such a manner that a long axis direction of the first pressing portion 600 matches a direction in which the first holding wall 202 and the second holding wall 204 face each other. More specifically, each of the grip portion 210 of the first holding wall 202 and the grip portion 210 of the second holding wall 204 has a recessed portion 218 formed at a position corresponding to the first pressing portion 600. The recessed portions 218 are formed in the surface of the first holding wall 202 and the surface of the second holding wall 204, which face each other. Distal ends of the first pressing portion 600 in the long-axis direction are fitted into the recessed portions 218. Each of the first holding wall 202 and the second holding wall 204 may have, instead of the recessed portion 218, a hood-shaped portion formed in the region to be brought into contact with the upper surface of the first pressing portion 600. In this case, a lower surface of the hood-shaped portion corresponds to the region to be brought into contact with the upper surface of the first pressing portion 600.

The intermediate block 300 forms part of a holding space 102 configured to hold the sample between the first holding wall 202 and the second holding wall 204, and is arranged above or below the cell 400 in such a manner as to be adjacent to the cell 400. The cell 400 is arranged between the openings 212 at substantially the same height level as that of the openings 212. More specifically, the intermediate block 300 includes the lower-level block 302, the middle-level block 304, and the sample supply knobs 306, which are arranged between the first holding wall 202 and the second holding wall 204.

The lower-level block 302 has an anode hole portion 308 and a cathode hole portion 310. The anode hole portion 308 and the cathode hole portion 310 each form part of the holding space 102. The anode plate 220 and the cathode plate 222 are located at bottoms of the anode hole portion 308 and the cathode hole portion 310, respectively. The cell 400 is arranged inside the lower-level block 302. More specifically, the lower-level block 302 has an internal space in which the cell 400 is to be arranged, and has the anode hole portion 308 and the cathode hole portion 310 below the space. The anode hole portion 308 and the cathode hole portion 310 are formed at positions corresponding to the anode plate 220 and the cathode plate 222 provided on the bottom wall 206. The anode hole portion 308 and the cathode hole portion 310 are spaces in which the sample is placed through a supply path 314, and each form part of the holding space 102 configured to hold the sample. The lower-level block 302 is arranged below the cell 400 in such a manner as to be adjacent to the cell 400. The cell 400 is arranged between the openings 212 of the first holding wall 202 and the second holding wall 204 at substantially the same height level as that of the openings 212.

The lower-level block 302 has the supply path 314 configured to supply the sample into the anode hole portion 308 and the cathode hole portion 310. More specifically, as illustrated in FIG. 7, the lower-level block 302 has a space (supply path 314) that brings a side surface of the anode hole portion 308 and a side surface of the cathode hole portion 310 and portions in which the sample supply knobs 306 are to be placed into communication with each other. The sample supply knobs 306 are separatable from a lower-surface retaining portion for the cell 400. When the sample supply knobs 306 are separated from the lower-level block 302, the sample can be supplied into the anode hole portion 308 and the cathode hole portion 310 through the supply path 314. With this configuration, the sample can easily be supplied without removal of the cell 400 from the zeta-potential measurement jig 100.

When the first grooves 214 are formed in the first holding wall 202 and the second holding wall 204 as illustrated in FIG. 4, the lower-level block 302 has the first protrusions 312 (plungers) provided at positions corresponding to the first grooves 214. After the lower-level block 302 is inserted from an upper side (z direction) into the space between the first holding wall 202 and the second holding wall 204 in a state of being fixed by the bottom wall 206 as illustrated in FIG. 3, a state illustrated in FIG. 4 is achieved. In an insertion process, when the first protrusions 312 are located at positions that do not correspond to the first grooves 214, the first protrusions 312 are located on an inner side in such a manner that distal ends thereof are in contact with surfaces of the first holding wall 202 and the second holding wall 204. Meanwhile, when the first protrusions 312 are located at the positions corresponding to the first grooves 214, the first protrusions 312 are elastically fitted into the first grooves 214. In this manner, the lower-level block 302 can easily be arranged.

The cell 400 has a measurement space 104 that communicates with each of the anode hole portion 308 and the cathode hole portion 310. The cell 400 is made of a material that transmits light radiated to the sample and light scattered by the sample. More specifically, the cell 400 is made of transparent glass. Further, as illustrated in FIG. 4 and FIG. 7, the cell 400 has two spaces and a space different from the two spaces. The two spaces pass from the anode hole portion 308 and the cathode hole portion 310 in the z direction to an upper surface of the cell 400, respectively. The space different from the two spaces brings the two spaces into communication with each other, and is defined along an xy plane. At a time of measurement, the above-mentioned spaces are filled with the sample. The space defined along the xy plane is located between the openings 212 of the first holding wall 202 and the second holding wall 204 at substantially the same height level as that of the openings 212, and functions as the measurement space 104. With this configuration, the sample arranged in the measurement space 104 is irradiated with light.

A lower surface of the cell 400 is supported by the lower-level block 302. In this embodiment, the position of the xy plane of the cell 400 is supported by a lower block 302. However, the cell 400 may be supported by the middle-level block 304. The cell 400 is arranged in a space surrounded by the lower-level block 302 under a state illustrated in FIG. 4, in which the lower-level block 302 is arranged between the first holding wall 202 and the second holding wall 204. After the arrangement of the cell 400, a state illustrated in FIG. 5 is achieved.

The middle-level block 304 has such a shape that overlaps with a peripheral edge portion of the cell 400 in plan view, and is arranged on an upper side of the cell 400. More specifically, as illustrated in FIG. 6 and FIG. 7, the middle-level block 304 has such a shape as to surround side surfaces of the cell upper-surface retaining portion 502. The middle-level block 304 is arranged above the cell 400 in such a manner as to be adjacent to the cell 400 that is arranged between the openings 212 of the first holding wall 202 and the second holding wall 204 at substantially the same level as that of the openings 212. The middle-level block 304 has a packing provided in a region in contact with the cell 400. The packing enables prevention of leakage of the sample to an outside of the zeta-potential measurement jig 100.

When the first grooves 214 are formed in the first holding wall 202 and the second holding wall 204 as illustrated in FIG. 4, the middle-level block 304 has the first protrusions 312 (plungers) provided at positions corresponding to the first grooves 214. After the middle-level block 304 is inserted from the upper side (z direction) into the space between the first holding wall 202 and the second holding wall 204 under a state in which the lower-level block 302 and the cell 400 are placed as illustrated in FIG. 5, a state illustrated in FIG. 5 is achieved. In an insertion process, when the first protrusions 312 are located at the positions that do not correspond to the first grooves 214, the first protrusions 312 are located on an inner side in such a manner that the distal ends thereof are in contact with the surfaces of the first holding wall 202 and the second holding wall 204. Meanwhile, when the first protrusions 312 are located at the positions corresponding to the first grooves 214, the first protrusions 312 are elastically fitted into the first grooves 214. In this manner, the middle-level block 304 can easily be arranged.

The cell retainer 500 is arranged above the intermediate block 300 between the first holding wall 202 and the second holding wall 204. The cell retainer 500 is configured to press the cell 400 and the intermediate block 300 toward the bottom wall 206. More specifically, the cell retainer 500 includes the cell upper-surface retaining portion 502 and the upper-level block 504. The cell upper-surface retaining portion 502 has a region for forming another part of the holding space 102. The cell upper-surface retaining portion 502 is arranged above the cell 400, and is configured to press the upper surface of the cell 400 toward the bottom wall 206. The upper-level block 504 is arranged above the middle-level block 304, and is configured to press the middle-level block 304 toward the bottom wall 206.

As illustrated in FIG. 7, the cell upper-surface retaining portion 502 is arranged in contact with the upper surface of the cell 400. A surface of the cell upper-surface retaining portion 502, which is to be in contact with the cell 400, is formed flat. A region of the surface of the cell upper-surface retaining portion 502, which is to be in contact with the cell 400, and which is to be in contact with the measurement space 104 forms part of the holding space 102 in cooperation with the cell 400. It is preferred that a packing be arranged in the region for forming part of the holding space 102 so as to prevent leakage of the sample. The cell upper-surface retaining portion 502 has a hole to be fitted over the second pressing portion 700. The hole is formed in an upper part of the cell upper-surface retaining portion 502, and a wall surface of the hole is threaded. When the second pressing portion 700 is rotated, the cell upper-surface retaining portion 502 is pressed downward by the second pressing portion 700 that is fitted into the hole. As a result, leakage of the sample from the holding space 102 can be prevented.

The upper-level block 504 is arranged above the cell upper-surface retaining portion 502 and the middle-level block 304. An upper side of the upper-level block 504 is in contact with the first pressing portion 600. As described later, when the first pressing portion 600 is rotated, the upper-level block 504 is pressed toward the bottom wall 206. Further, the upper-level block 504 has a through hole located above the cell 400, which passes through the cell 400 in a vertical direction. The second pressing portion 700 is placed in the through hole. A side wall of the through hole is not threaded. Thus, the cell upper-surface retaining portion 502 can be pressed by the first pressing portion 600 toward the bottom wall 206 independently of the pressing performed by the first pressing portion 600 on the cell upper-surface retaining portion 502.

The cell retainer 500 has one of the second groove 216 and the second protrusion 506. More specifically, when the second grooves 216 are formed in the first holding wall 202 and the second holding wall 204 as illustrated in FIG. 6, the upper-level block 504 has the second protrusions 506 (plungers) formed at positions corresponding to the second grooves 216. The cell upper-surface retaining portion 502 is arranged on the cell 400 under a state in which the middle-level block 304 is placed on the cell 400. Further, after the upper-level block 504 is inserted into the space between the first holding wall 202 and the second holding wall 204 from the upper side (z direction), a state illustrated in FIG. 6 is achieved. At this time, because the upper-level block 504 has the second protrusions 506 to be elastically fitted into the second grooves 216, the upper-level block 504 can easily be arranged.

The first pressing portion 600 has a shape with a long-axis direction and a short-axis direction. The first pressing portion 600 is rotated in an in-plane direction of the bottom wall 206 to press the upper-level block 504 toward the bottom wall 206. More specifically, the first pressing portion 600 has a substantially ellipsoidal shape with the long-axis direction and the short-axis direction in plan view. The first pressing portion 600 has an upper surface having tapered portions in such a manner that a height in the z direction decreases toward ends in the long-axis direction. The first pressing portion 600 is arranged on the upper-level block 504. The first pressing portion 600 is rotatable in the xy plane. When the first pressing portion 600 is arranged in such a manner that its long-axis direction matches the y-axis direction, the first pressing portion 600 is fitted into the recessed portions 218 formed in the grip portions 210. When the first pressing portion 600 is fitted into the recessed portions 218, the upper-level block 504 arranged below the first pressing portion 600 is pressed toward the bottom wall 206 along the tapered portions of the upper surface. When not the recessed portion 218 but the hood-shaped portion is formed on the grip portion 210, the lower surface of the hood-shaped portion is brought into contact with the upper surface of the first pressing portion 600.

The second pressing portion 700 is placed in the through hole to press the cell upper-surface retaining portion 502 against the cell 400. More specifically, the second pressing portion 700 has a knob portion 702 and a shaft portion 704. The knob portion 702 is arranged on the first pressing portion 600, and is fixed to the shaft portion 704. The shaft portion 704 is placed in the through hole formed in the first pressing portion 600 and the upper-level block 504. A lower end of the shaft portion 704 is fitted into a hole formed in the cell upper-surface retaining portion 502. The lower end of the shaft portion 704 has a threaded surface. When the knob portion 702 is rotated, the lower end of the shaft portion 704 presses the cell upper-surface retaining portion 502 downward. When the cell upper-surface retaining portion 502 is pressed, the leakage of the sample from the holding space 102 can be prevented.

The intermediate block 300 having the first protrusions 312 and the cell retainer 500 having the second protrusions 506 have been described. However, the intermediate block 300 may have the first grooves 214, and the cell retainer 500 may have the second grooves 216.

Further, the lower-level block 302, the middle-level block 304, and the upper-level block 504 can be inserted into and removed from the space between the first holding wall 202 and the second holding wall 204. The first protrusions 312 and the second protrusions 506 are elastically fitted into the first grooves 214 and the second grooves 216, respectively. Thus, the insertion and removal can easily be achieved. As a result, the sample can easily be replaced.

Further, the plungers have been described as the first protrusions 312 and the second protrusions 506. However, the first protrusions 312 and the second protrusions 506 are not required to be plungers as long as the first protrusions 312 and the second protrusions 506 are elastically fitted into the first grooves 214 and the second grooves 216.

Further, one second pressing portion 700 provided at a center of a surface of the upper-level block 504, which extends along the xy plane, has been described. However, four second pressing portions 700 may be provided in four corners of the surface of the upper-level block 504. Further, the first pressing portion 600 configured to press the upper-level block 504 and the second pressing portion 700 configured to press the cell upper-surface retaining portion 502 have been described. The second pressing portion 700 may press all of the lower-level block 302, the middle-level block 304, and the upper-level block 504. For example, when the second pressing portions 700 are provided in the four corners of the surface of the upper-level block 504, the lower-level block 302, the middle-level block 304, and the upper-level block 504 may have through holes formed at positions corresponding to the second pressing portions 700. In this case, an inner wall of each of the through holes and the shaft portion 704 of each of the second pressing portions 700 are threaded. When the second pressing portions 700 are rotated, all of the lower-level block 302, the middle-level block 304, and the upper-level block 504 are pressed toward the bottom wall 206.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A zeta-potential measurement jig, to be used for an electrophoretic mobility measuring device, comprising:
   a frame body including:
      a first holding wall and a second holding wall, which are arranged in such a manner as to be opposed to each other, and the first holding wall has a first opening and the second holding wall has a second opening, and the first opening and the second opening are aligned with one another at a position opposite to one another; and
      a bottom wall configured to couple a lower end of the first holding wall and a lower end of the second holding wall to each other;
   an intermediate block which is arranged above or below a cell in such a manner as to be adjacent to the cell, the cell being arranged between the openings at substantially the same level as that of the openings, and
   a cell retainer, which is arranged above the intermediate block between the first holding wall and the second holding wall, and is configured to press the cell and the intermediate block toward the bottom wall,
   wherein at least one of the first holding wall or the second holding wall has one of a first groove or a first protrusion to be elastically fitted into a first support groove, which is configured to support the intermediate block on a lateral side, and
   wherein the intermediate block has another one of the first groove or the first protrusion.

2. The zeta-potential measurement jig according to claim 1,
   wherein at least one of the first holding wall or the second holding wall has one of a second groove or a second protrusion to be elastically fitted into a second support groove, which is configured to support the cell retainer on a lateral side, and
   wherein the cell retainer has another one of the second groove or the second protrusion.

3. The zeta-potential measurement jig according to claim 2, wherein one of the first protrusion and/or the second protrusion comprises a plunger.

4. The zeta-potential measurement jig according to claim 1, wherein the intermediate block includes:
   a lower-level block having an anode hole portion and a cathode hole portion at bottoms of which an anode plate and a cathode plate are to be located, respectively, the anode hole portion and the cathode hole portion each being configured to form part of the holding space, the lower-level block having an internal space in which the cell is to be arranged; and
   a middle-level block having such a shape that overlaps with a peripheral edge portion of the cell in plan view, which is to be arranged above the cell.

5. The zeta-potential measurement jig according to claim 4, wherein the cell retainer includes:
   a cell upper-surface retaining portion having a region for forming another part of the holding space, which is arranged on the cell to press an upper surface of the cell toward the bottom wall; and
   an upper-level block, which is arranged above the middle-level block to press the middle-level block toward the bottom wall.

6. The zeta-potential measurement jig according to claim 5, further comprising a first pressing portion having a shape with a long-axis direction and a short-axis direction, which is to be rotated in an in-plane direction of the bottom wall to press the upper-level block toward the bottom wall,
   wherein each of the first holding wall and the second holding wall has a region to be brought into contact with an upper surface of the first pressing portion when the first pressing portion is located in such a manner that the long-axis direction of the first pressing portion matches a direction in which the first holding wall and the second holding wall face each other.

7. The zeta-potential measurement jig according to claim 5,
   wherein the upper-level block has a through hole passing in a vertical direction, which is located above the cell, and
   wherein the zeta-potential measurement jig further comprises a second pressing portion to be placed in the through hole, which is configured to press the cell upper-surface retaining portion against the cell.

8. The zeta-potential measurement jig according to claim 4, wherein the lower-level block has a supply path configured to supply the sample to the anode hole portion and the cathode hole portion.

9. The zeta-potential measurement jig according to claim 4, further comprising the cell having a measurement space that communicates with the anode hole portion and the cathode hole portion,
   wherein the cell is made of a material that transmits light to be radiated to the sample and scattered light corresponding to the light scattered by the sample.

* * * * *